(12) United States Patent
Maeda (10) Patent No.: US 10,705,396 B2
(45) Date of Patent: Jul. 7, 2020

(54) CIRCUIT BOARD AND DISPLAY PANEL

(71) Applicant: SHARP KABUSHIKI KAISHA, Sakai, Osaka (JP)

(72) Inventor: Yoshimi Maeda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/392,145

(22) Filed: Apr. 23, 2019

(65) Prior Publication Data
US 2019/0331976 A1 Oct. 31, 2019

(30) Foreign Application Priority Data
Apr. 26, 2018 (JP) .................................. 2018-085152

(51) Int. Cl.
*G02F 1/136* (2006.01)
*G02F 1/1362* (2006.01)
*G02F 1/1345* (2006.01)
*G02F 1/1368* (2006.01)

(52) U.S. Cl.
CPC .... *G02F 1/136286* (2013.01); *G02F 1/13452* (2013.01); *G02F 1/1368* (2013.01); *G02F 2001/136254* (2013.01)

(58) Field of Classification Search
CPC ........... G02F 1/13452; G02F 1/136286; G02F 1/136254; G02F 1/1368
See application file for complete search history.

(56) References Cited

U.S. PATENT DOCUMENTS

2016/0148549 A1   5/2016  Okumoto

FOREIGN PATENT DOCUMENTS

| JP | 2010-033405 A | 2/2010 |
| JP | 2010-224161 A | 10/2010 |
| JP | 2016-099580 A | 5/2016 |

*Primary Examiner* — Douglas M Menz
(74) *Attorney, Agent, or Firm* — ScienBiziP, P.C.

(57) ABSTRACT

A circuit board includes first wiring, a first wiring arrangement region, first unit inspection sections, second wirings, a second wiring arrangement region, and second unit inspection sections. The first wirings are arranged regularly. The first wirings are arranged in the first wiring arrangement region. The first unit inspection sections are arranged in the first wiring arrangement region at given intervals and are a target for inspection images. The second wiring arrangement region is adjacent to the first wiring arrangement region. The second wirings are arranged in the second wirings. The second unit inspection sections are arranged in the second wiring arrangement region at given intervals and are occasionally the target for the inspection images. The second unit inspection sections are arranged in the second wiring arrangement region in an identical pattern.

7 Claims, 8 Drawing Sheets

CIRCUIT BOARD AND DISPLAY PANEL

CROSS REFERENCE TO RELATED APPLICATION

This application claims priority from Japanese Patent Application Mo. 2018-085152 filed on Apr. 26, 2018. The entire contents of the priority application are incorporated herein by reference.

TECHNICAL FIELD

The technology described herein relates to a circuit board and a display panel.

BACKGROUND

An examples of such a wiring pattern generating device is disclosed in Japanese Patent Application Publication No. 2010-33405A. The wiring pattern generating device allows automatic generation of a wiring pattern suitable for optical defect inspection. The wiring pattern generating device described in the Patent Literature includes an information obtaining device, a correction amount calculating device, and a wiring processing device. The information obtaining device obtains information necessary for automatic generation of a wiring pattern. The correction amount calculating device calculates a correction amount necessary for connection of pads at an equal angle in accordance with the information obtained with the information obtaining device. The wiring processing device determines a layout pattern of wirings for conducting the pads in such a manner that wirings in a first group of the pads extend at the equal angle with respect to a reference direction and wirings in a second group of the pads extend perpendicularly to the reference direction by the correction amount calculated with the correction amount calculating device.

The Patent Literature described above discloses a circuit board whose layout pattern is determined by the wiring pattern generating device. The circuit board having the layout pattern arranged thereon entirely regularly achieves appropriate inspection with the optical defect inspection. However, the circuit board includes, in addition to the target wirings subjected to the optical defect inspection, wirings for only use of displaying an inspection image. Such wirings are not used for displaying a normal image, and thus requires no optical defect inspection. A wiring that ordinarily needs no inspection may be erroneously inspected depending on a certain condition such as accuracy of the optical inspecting device. In this case, the wiring may be determined defective.

SUMMARY

The technology described herein was made in view of the above circumstances. An object is to avoid defective determination caused by erroneous inspection.

The present invention discloses a circuit board. The circuit board includes a plurality of first wirings, a first wiring arrangement region, a plurality of first unit inspection sections, a plurality of second wirings, a second wiring arrangement region, and a plurality of second unit inspection sections. The first wirings are arranged regularly. The first wiring arrangement region has the first wirings arranged therein. The first unit inspection sections are arranged in the first wiring arrangement region at given intervals and are a target for inspection images. The second wiring arrangement region is adjacent to the first wiring arrangement region and has the second wirings arranged therein. The second unit inspection sections are arranged in the second wiring arrangement region at given intervals and are occasionally a target for the inspection images. The second wiring arrangement region has the second unit inspection sections arranged therein in an identical pattern.

Firstly, in order to inspect the first wirings, inspection images of the first unit inspection sections of the first wiring arrangement region are obtained. The first unit inspection sections are arranged at given the intervals in the first wiring arrangement region. Then, the imaged inspection images are compared with one another. If the inspection images conform, the first wirings are decided to be formed appropriately, thereby being determined non-defective. If the inspection images do not conform, the first wirings are decided to be formed inappropriately, thereby being determined defective. On the other hand, the second wirings are arranged in the second wiring arrangement region adjacent to the first wiring arrangement region although the second wirings are not originally subjected to inspection. This may lead to erroneous inspection depending on a certain condition such as accuracy of the inspecting device. In this case, the inspection images in the second unit inspection sections of the second wiring arrangement region are to be taken. The second unit inspection sections are arranged at given the intervals. Here, the second wiring arrangement region includes the second unit inspection sections with an identical pattern. Accordingly, the inspection images conform certainly when comparison is made among them. This avoids defective determination by the erroneous inspection of the second unit inspection sections, leading to avoidance of the case such as, when a large number of the circuit boards are inspected, most of the circuit boards are determined defective. Such an erroneous inspection is likely to occur when a portion in the first wiring arrangement region adjacent to the second wiring arrangement region is inspected. However, when the detective determination caused by the erroneous inspection is avoidable, the portion in the first wiring arrangement region adjacent to the second wiring arrangement region is inspectable. This achieves appropriate inspection on the defective of the portion in the first wirings.

The present invention is capable of avoiding defective determination caused by erroneous inspection.

DETAILED DESCRIPTION

First Embodiment

Figure 1:
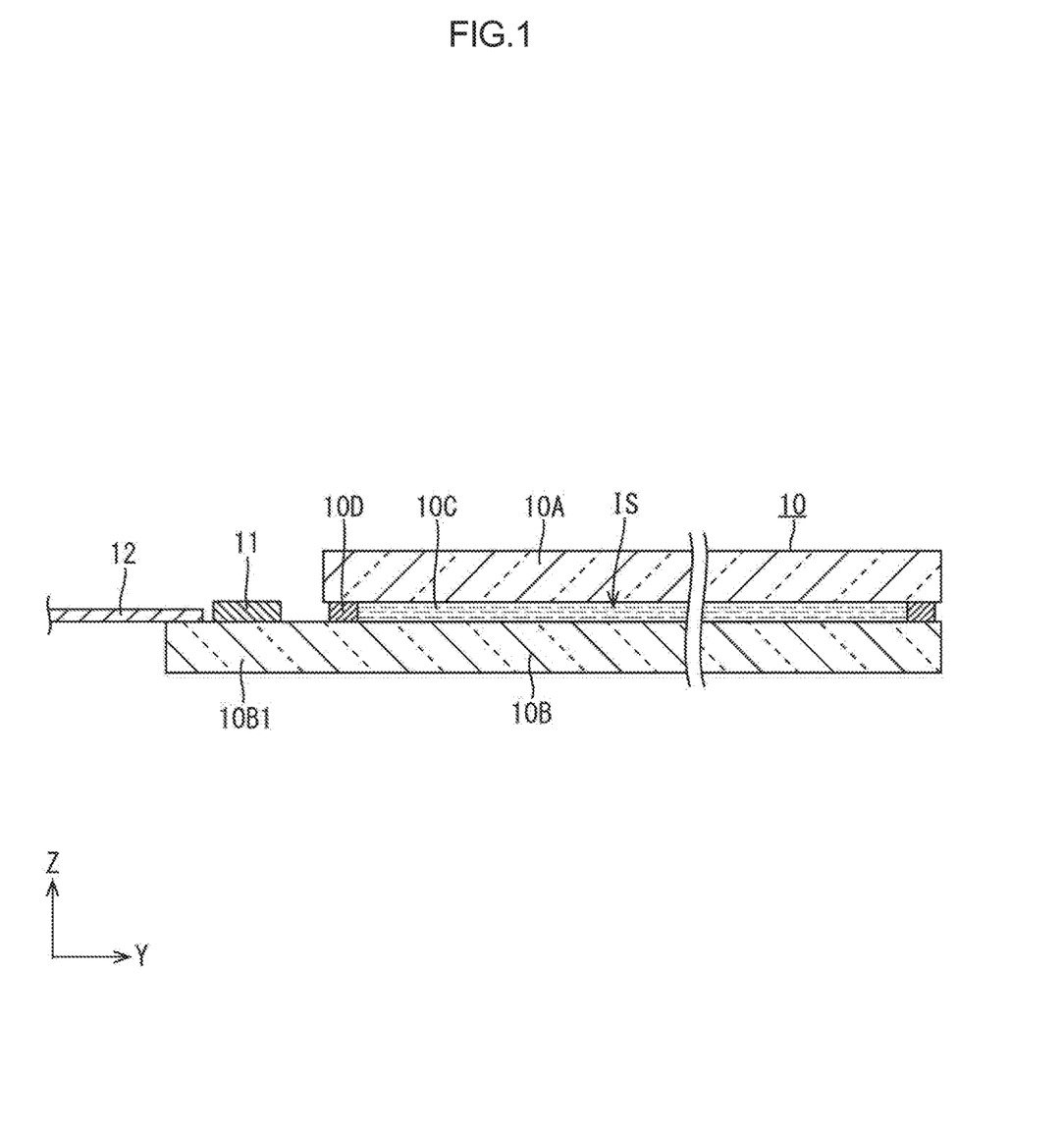
FIG. 1 is a sectional view of a liquid crystal panel according to a first embodiment.

The following describes a first embodiment of the present invention with FIGS. 1 to 6. This embodiment exemplarily describes a liquid crystal display device 10 and an array substrate 10B provided therewith. Note that each of drawings partially indicates an X-axis, a Y-axis, and a Z-axis, each of which corresponds to the direction in which the drawing is illustrated. Moreover, upward and downward directions illustrated in FIG. 1 are each a reference, and upper and lower sides therein correspond to front and rear sides, respectively.

Figure 2:
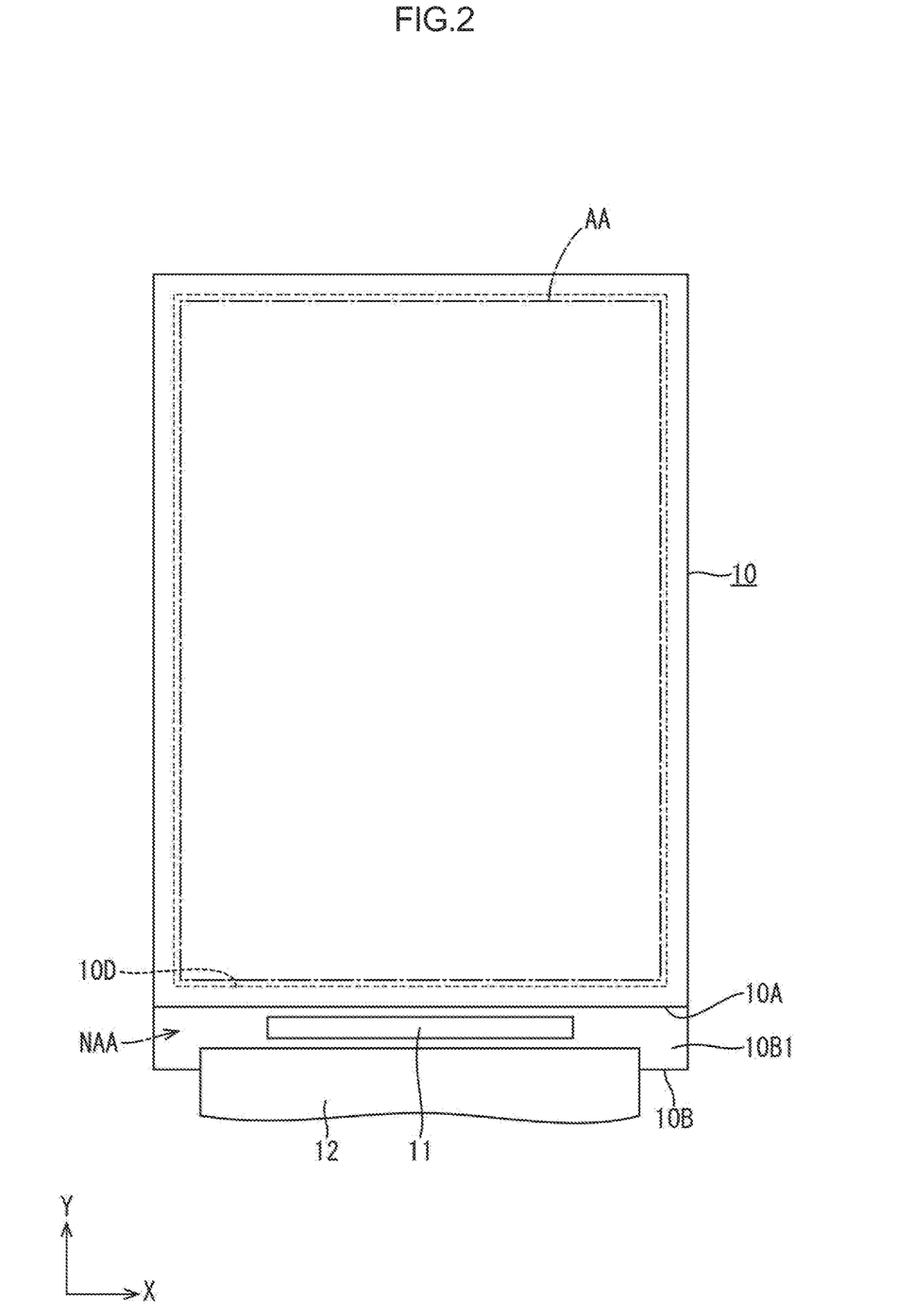
FIG. 2 is a plan view of the liquid crystal panel.

The liquid crystal panel 10 displays an image with illuminating light from a back-light device (lighting device) not shown. As illustrated in FIG. 1, the liquid crystal panel 10 includes at least paired glass substrates 10A, 10B, a liquid crystal layer 10C, and a sealant 10D. The paired glass substrates 10A, 10B are substantially transparent with high translucency. The liquid crystal layer 10C is disposed in an interior space IS between opposite faces of the paired substrates 10A, 10B, and contains liquid crystal molecules of a material whose optical property is variable depending on electric field application. The sealant 10D is disposed between the paired substrates 10A, 10B to surround the interior space IS and seal the interior space IS and the liquid crystal layer 10C. A surface side (front side) of the paired substrates 10A, 10B that form the liquid crystal panel 10 is referred to as a CF substrate (opposite substrate) 10A, whereas a rear side (backside) thereof is referred to as an array substrate (circuit board, active matrix substrate) 10B. The CF substrate 10A and the array substrate 10B are each a glass substrate, and each include various films laminated on an internal face of the glass substrate. The sealant 10D is made of an optical curing resin (optical curing material) such as an ultraviolet-ray curing resin. Moreover, polarizers, shot shown, adhere to outer faces of the paired substrates 10A, 10B, respectively. FIG. 2 illustrates by dotted lines a region in which the sealant 10D is formed. Here, the paired substrates 10A, 10B that form the liquid crystal panel 10 may be referred to as a "liquid crystal panel substrate (display panel substrate)", respectively.

As illustrated in FIG. 2, the liquid crystal panel 10 is rectangular in a vertical direction. The liquid crystal panel 10 has long sides along the Y-axis direction, and short sides along the X-axis direction, and a thickness along the Z-axis direction. The liquid crystal panel 10 includes an active area AA at a center portion of a screen in which the image is displayed, and a non-active area NAA at a frame-shaped outer circumferential portion that surrounds the active area AA of the screen. Note that FIG. 2 illustrates the active area AA surrounded by alternate long and short dashed lines. The array substrate 10B that forms the liquid crystal panel 10 has long sides larger than those of the CF substrate 10A, and adheres to the CF substrate 10A while a first end of the long sides thereof conforms to a first end of the CF substrate 10A.

Accordingly, a second end of the array substrate 10B relative to the long sides is referred to as a CF substrate non-overlapped portion 10B1 in which the CF substrate 10A does not overlap. The CF substrate non-overlapped portion 10B1 is exposed externally from the CF substrate 10A while a front plate thereof is not covered. In addition, the CF substrate non-overlapped portion 10B1 has parts, such as a driver (panel driving component) 11 or a flexible board (signal transmitting component) 12, bonded thereon. Various types of terminals are formed on a bonding region of the CF substrate non-overlapped portion 10B1 in which the driver 11 and the flexible board 12 are bonded.

The driver 11 is formed by LSI chips having a drive circuit arranged therein. As illustrated in FIG. 2, The driver 11 is subjected to chip on glass (COG) bonding on the CF substrate non-overlapped portion 10B1 as the non-displayed area NAA. The driver 11 is disposed adjacent to the active area AA with respect to the flexible board 12, which is to be mentioned later, in the Y-axis direction. The driver 11 allows processing of various signals from the flexible board 12. The flexible board 12 includes a substrate trade from a synthetic resin material (e.g., polyimide resin) with insulative and flexible properties on which a large number of wiring patterns (not shown) are arranged. The flexible board 12 has a first end connected to the CF substrate non-overlapped portion 10B1 of the array substrate 10B, and a second end connected to a control substrate (signal supplying source), not shown. The various signals from the control substrate are transmitted to the liquid crystal panel 10 via the flexible board 12. The signals are processed with the driver 11 in the non-displayed area AA, and then are outputted to the active area AA. The driver 11 and the flexible board 12 are electrically and mechanically connected to the CF substrate non-over lapped portion 10B1 via an anisotropic conductive film (ACF), not shown.

Figure 3:
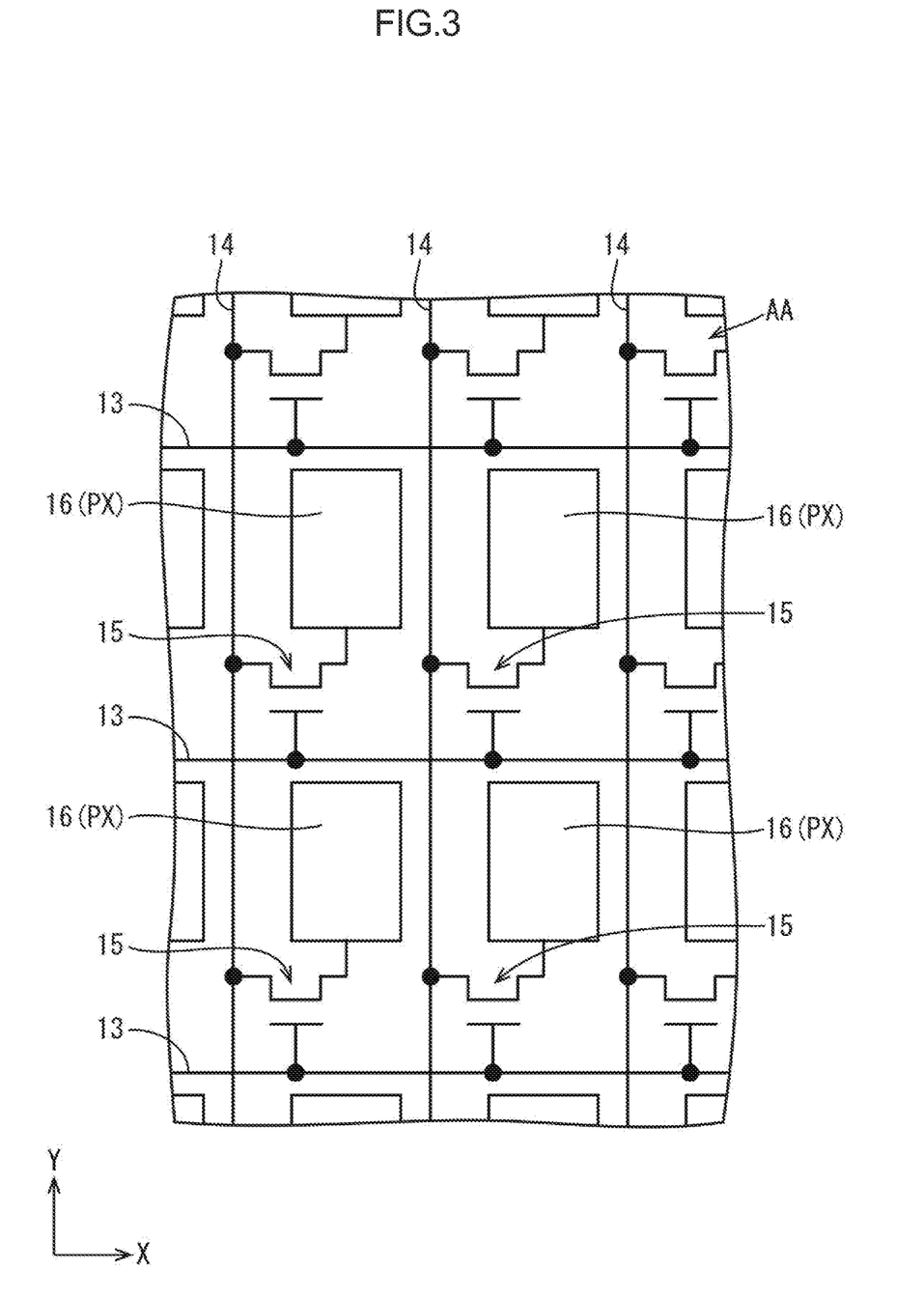
FIG. 3 illustrates a circuit diagram representing pixels in an active area of the liquid crystal panel.

As illustrated in FIG. 3, the active area AA of the array substrate 10B includes an inner face in which a large number of gate lines (scanning lines) 13 and source lines (signal lines, data lines) 14 are arranged in a grid shape. Moreover, TFTs 15 as switching elements and pixel electrodes 16 are arranged around intersections of the gate lines 13 and the source lines 14. The gate lines 13 extend across the active area AA transversely in the X-axis direction to be connected to gate electrodes of the TFTs 15, whereas the source lines 14 extend across the active area AA vertically in the Y-axis direction to be connected to source electrodes of the TFTs 15. A large number of gate lines 13 are spaced apart at given intervals in the Y-axis direction, whereas a large number of source lines 14 are spaced apart at given intervals in the X-axis direction. Many TFTs 15 and many pixel electrodes 16 are planarly arranged in a matrix array (in a row and column manner) in the X-axis direction and the Y-axis direction, respectively. The TFTs 15 have drain electrodes that are connected to the pixel electrodes 16. Moreover, the TFTs 15 are driven in response to various scanning signals supplied to the gate lines 13. In association with the drive, electric potential in response to image signals (signals, data signals) supplied to the source lines 14 is charged to the pixel electrodes 16. In contrast to this, the active area AA of the CF substrate 10A includes an inner side, not shown, in which a light-shielding part (black matrix) is arranged that is superimposed on the pixel electrodes 16. The light-shielding part divides color filters with three colors of read (R), green (G), and blue (B) and adjacent color filters. The liquid crystal panel 10 includes the color filters with the colors of R, G, B that are arranged in line in the X-axis direction, and three-pixel electrodes 16 opposite to the color filters, respectively, to form three-colored pixel PXs. Moreover, common electrodes (not shown) are arranged in either the CF substrate 10A or the array substrate 10B. The common electrodes are made of a transparent electrode material same as that of the pixel electrodes 16, and are spaced apart from the pixel electrodes 16 in an overlapped manner. The liquid crystal panel 10 includes a liquid crystal layer 10C in which a given electric field is applied in accordance with potential difference between the common electrodes and the pixel electrodes 16. This allows each of the pixels PX to perform predetermined gradation display.

Figure 4:
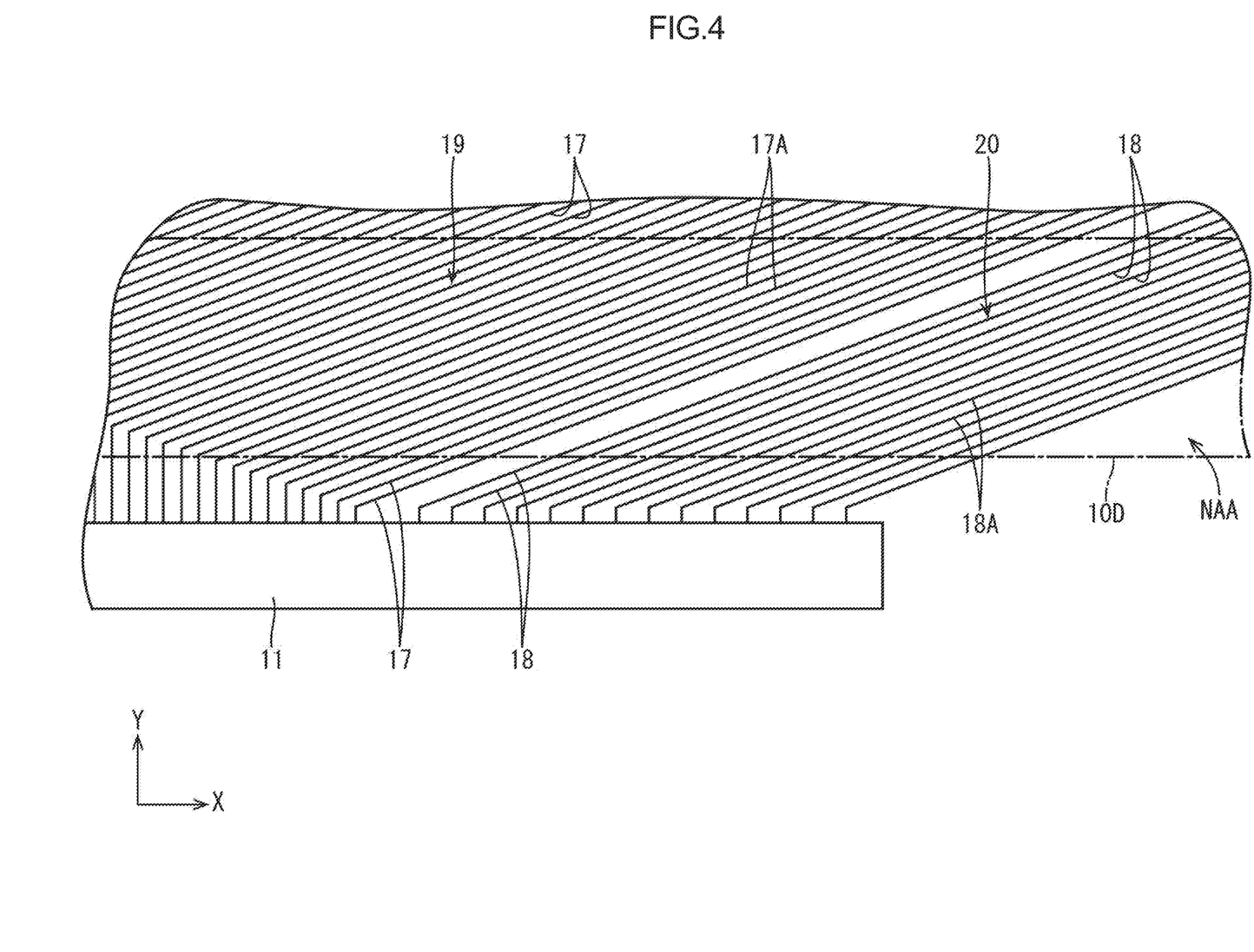
FIG. 4 is a plan view of wiring adjacent to a driver in an array substrate that forms the liquid crystal panel.

The output signals from the driver 11 of the liquid crystal panel 10 configured in the above-described manner include at least image signals supplied to the source lines 14. The image signals from the driver 11 are transmitted to the source lines 14. Accordingly, as illustrated in FIG. 4, the array substrate 10B includes first wirings 17 that are routed from a bonding region of the driver 11 to the active area AA. The first wiring 17 has a first end that is connected to a terminal (not shown) in the bonding region of the driver 11, and a second end that is directly or indirectly connected to an end of the source line 14 in the active area AA. In the case in which the second end of the first wiring 17 is indirectly connected to the end of the source line 14, a red-green-blue (RGB) switching circuit or an electrical static discharge (ESD) protection circuit, for example, is interposed. In contrast to this, the output signals from the driver 11 include image signals for display inspection supplied to the source lines 14. The image signals for display inspection is used for displaying an image for display inspection in the active area AA of the liquid crystal panel 10 upon the display inspection performed during manufacturing of the liquid crystal panel 10. The image signals for inspection from the driver 11 are transmitted to the source lines 14. Accordingly, the array substrate 10B includes second wirings 18 that are routed from the bonding region of the driver 11 to the active area AA. The second wiring 18 has a first end that is connected to a terminal (not shown) in the bonding region of the driver 11, and a second end that is directly or indirectly connected to the end of the source line 14 in the active area AA.

As illustrated in FIG. 4, the first wiring 17 and the second wiring 18 are routed in the array substrate 10B so as to expand outward in the X-axis direction as they approach from the bonding region of the driver 11 to the active area AA in the Y-axis direction to form a fan shape in its entirety. A plurality of first wirings 17 and a plurality of second wirings 18 extend alternately in parallel. The first end of the first wiring 17 is connected to a center portion of the driver 11 in the X-axis direction, whereas the second end of the second wiring 18 is connected an end portion of the driver 11 in the X-axis direction. Accordingly, a first wiring arrangement region 19 in which the first wirings 17 are arranged in the array substrate 10B is disposed adjacent to the center in the X-axis direction, whereas a second wiring arrangement region 20 in which the second wirings 18 are arranged is disposed adjacent to the end in the X-axis direction. The first wiring arrangement region 19 and the second wiring arrangement region 20 are positioned adjacent to each other. The first wiring 17 and the second wiring 18 overlap the sealant 10D between the bonding region of the driver 11 and the active area AA. The overlapped portion corresponds to seal overlapping sections 17A, 18A, respectively. FIG. 4 illustrates by alternate long and short dash lines a region in which the sealant 10D is formed.

Figure 5:
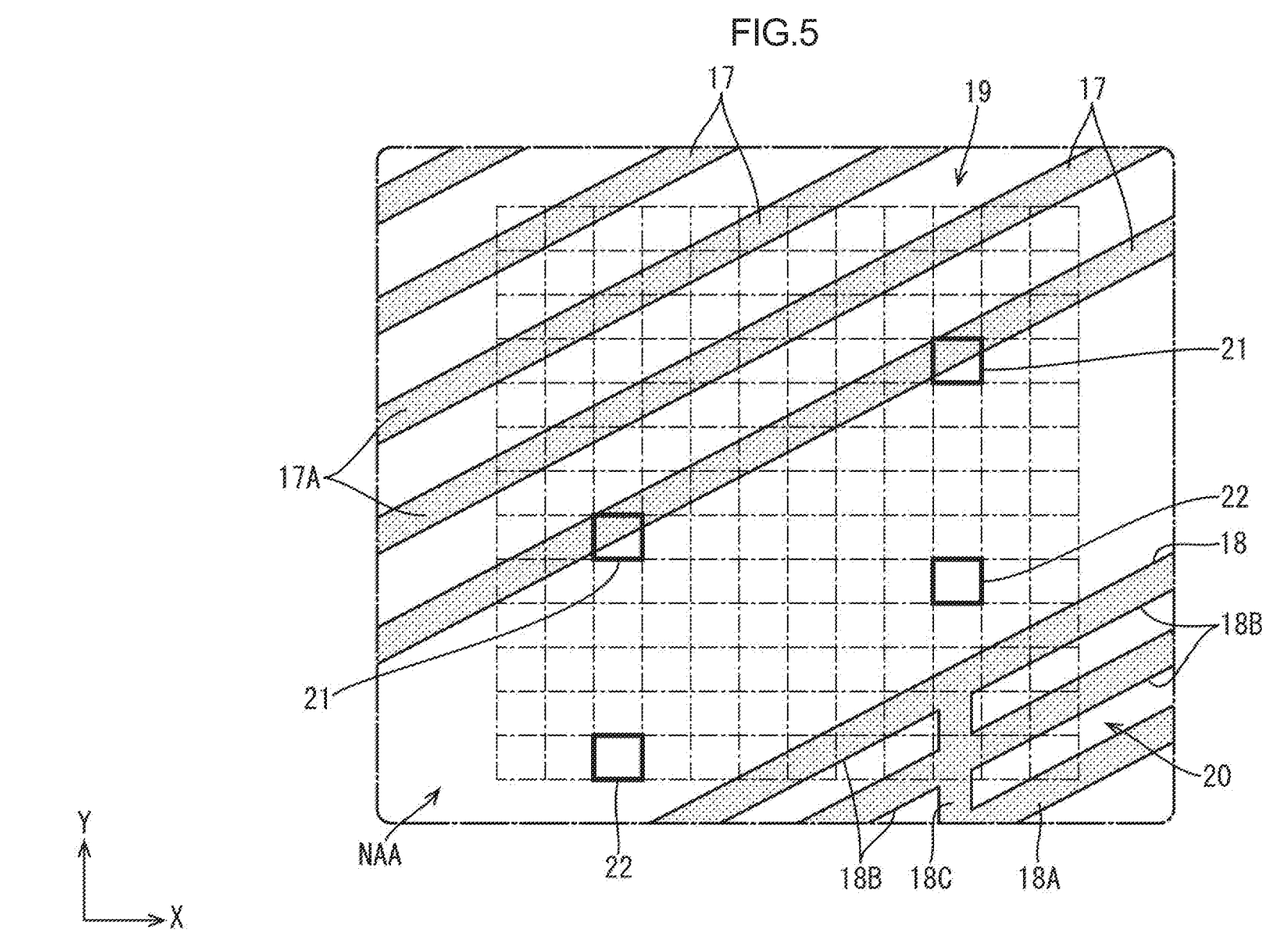
FIG. 5 is a plan view of first unit inspection sections and second unit inspection sections in a first wiring arrangement region with first wirings arranged therein and a second wiring arrangement region with second wiring arranged therein, respectively, in the array substrate.

More specifically, as illustrated in FIG. 5, a plurality of first wirings arranged in the first wiring arrangement region 19 are arranged regularly with an equal line width at equal intervals. Note that FIG. 5 illustrates by hatch regions in which the first wirings 17 and the second wirings 18 are formed. In contrast to this, a plurality of second wirings 18 in the second wiring arrangement region 20 each have a line width smaller than the first wirings 17. A plurality of slits 18B are opened at least partially or entirely of the seal overlapping section 18A. The slits 18B extend regularly in parallel along the direction in which the second wirings 18 extend. Moreover, the slits 18B each have a width smaller than the intervals of the first wirings 17. The slits 18B allow transmittance of ultraviolet rays applied upon curing of the sealant 10D, leading to enhanced curing of the sealant 10D. Moreover, the seal overlapping section 18A of the second wirings 18 includes a bridge 18C that extends across the slits 18B. The bridge 18C connects divided parts of the slits 18B of the seal overlapping section 18A (divided second wirings), thereby ensuring redundancy of the second wirings 18.

The inspections performed during manufacturing of the liquid crystal panel 10 include an automatic inspection by an optical automatic defect inspection device (not shown), other than the display inspection with the second wirings 18. With the inspecting device, it is automatically inspected whether or not any defect such as a break is present in the wirings formed in the array substrate 10B. The wiring inspection with the optical automatic defect inspecting device is performed to at least the first wirings 17. Accordingly, such an inspection is not performed to the second wirings 18. The first wiring 17 has a function of transmitting the image signals from the driver 11 to the source lines 14 when the liquid crystal panel 10 is used, and thus it is essential for exerting the function of image display. Consequently, the inspection on presence or absence of the defect such as the break is needed. In contrast to this, the second wirings 18 are needed for the display inspection during the manufacturing of the liquid crystal panel 10. However, the second wirings 18 are no longer used during normal usage after the liquid crystal panel 10 is delivered as one product. Consequently, there is no need to perform the above-described wiring inspection to the second wirings 18.

The following describes in detail the wiring inspection. The wiring inspection is performed at least after various types of wirings are formed on the array substrate 10B. Accordingly, the wiring inspection may be performed either before or after the array substrate 10B adheres to the CF substrate 10A. Moreover, the wiring inspection may be performed either before or after the driver 11 or the flexible board 12 is bonded. Note that the wiring inspection is occasionally performed a plurality of times during the manufacturing of the liquid crystal panel 10. The optical automatic defect inspection device used in the wiring inspection at least includes a stage, a light irradiator, a plurality of photo-detective sensors (image sensors), a body tube, and a determining part. The array substrate 10B is mounted on the stage. The light irradiator irradiates a front face of the array substrate 10B with light. The photo-detective sensors receive the light reflected from the front face of the array substrate 10B. The body tube accommodates the photo-detective sensors. The determining part determines a quality of the image in accordance with an inspection image obtained by the photo-detective sensors. The stage moves the array substrate 10B at least with respect to the body tube (photo-detective sensors) in reference to an alignment mark (not shown) of the array substrate 10B, thereby allowing positioning of the array substrate 10B with respect to the body tube. On the front face of the array substrate 10B irradiated with light from the light irradiator for the wiring inspection, an amount of light becomes larger in an area in which the wirings made of a metal film are formed (wiring formed region), whereas an amount of light becomes smaller in an area in which no wiring is formed (non-wiring formed region).

The body tube faces the stage across the array substrate 10B. The light reflected on the front face of the array substrate 10B enters into the body tube. The photo-detective sensors accommodated in the body tube are arranged in line at given intervals. The photo-detective sensors receive the light from the array substrate 10B positioned by the stage, and obtains the inspection image in accordance with the received light. The obtained inspection image is a gray level in response to the amount of light in which the wiring formed region and the non-wiring formed region are reflected. The photo-detective sensors each have a photo-detective area in a square shape whose side has a length of approximately 2 to 4 µm. Where the stage positions the array substrate 10B appropriately with respect to the body tube, the first wiring arrangement region 19 of the array substrate 10B is positioned to overlaps the body tube, whereby the photo-detective sensors in the body tube receive the reflected light on the first wiring arrangement region 19. At this time, as illustrated in FIG. 5, the first wiring arrangement region 19 includes a plurality of first unit inspection sections 21 as a target for the inspection images by the photo-detective sensors. Note that FIG. 5 illustrates an imageable area of the inspection image by the photo-detective sensors surrounded by dotted lines, and the first unit inspection sections 21 of the first wiring arrangement region 19 surrounded by thick lines in which inappropriate positioning is made. The first unit inspection sections 21 are made by reflecting arrangement of the photo-detective sensors. Specifically, in FIG. 5, the arrangement corresponds to that in which the first unit inspection sections 21 are arranged obliquely with respect to the X-axis direction and the Y-axis direction. The first unit inspection sections 21 are set in such a manner that the wiring formed region in which the first wirings 17 are formed and the non-wiring formed region in which no first wiring 17 is formed have an identical pattern in arrangement and area ratio when the first wirings 17 are appropriately formed. If the first wiring 17 has some defects such as a break, the wiring formed region in which the first wirings 17 are formed in the first unit inspection sections 21 and the non-wiring formed region in which no first wiring 17 is formed have different patterns in arrangement and area ratio. Consequently, when the inspection images obtained by the photo-detective sensors conform, the determining part decides that the first wirings 17 are formed appropriately, thereby determining non-defective. If the inspection images do not conform, the determining part decides that the first wirings 17 are formed inappropriately, thereby determining defective.

In contrast to this, when erroneous reading of the alignment mark or a positional displacement caused by accuracy of stage movement occurs during the wiring inspection with the optical automatic defect inspection device, a misregistration of several tens to 100 µm may be generated between the array substrate 10B and the body tube along the plate of the array substrate 10B. If such a misregistration is generated while the wiring inspection is performed to a portion of the first wiring arrangement region 19 adjacent to the second wiring arrangement region 20, the wiring inspection is occasionally performed while the body tube overlaps not the first wiring arrangement region 19 but the second wiring arrangement region 20. In this case, the wiring inspection is erroneously performed to the second wiring arrangement region 20 to which the wiring inspection is originally unnecessary. As illustrated in FIG. 5, when such an erroneous inspection is performed, the second wiring arrangement region 20 includes a plurality of second unit inspection sections 22 as the target for the inspection images by the photo-detective sensors. Note that FIG. 5 illustrates the second unit inspection section 22 of the second wiring arrangement region 20 surrounded by thick lines in which the erroneous inspection is performed. The second unit inspection sections 22 are made by reflecting arrangement of the photo-detective sensors. Specifically, in FIG. 5, the arrangement corresponds to that in which the second unit inspection sections 22 are arranged obliquely with respect to the X-axis direction and the Y-axis direction.

Figure 6:
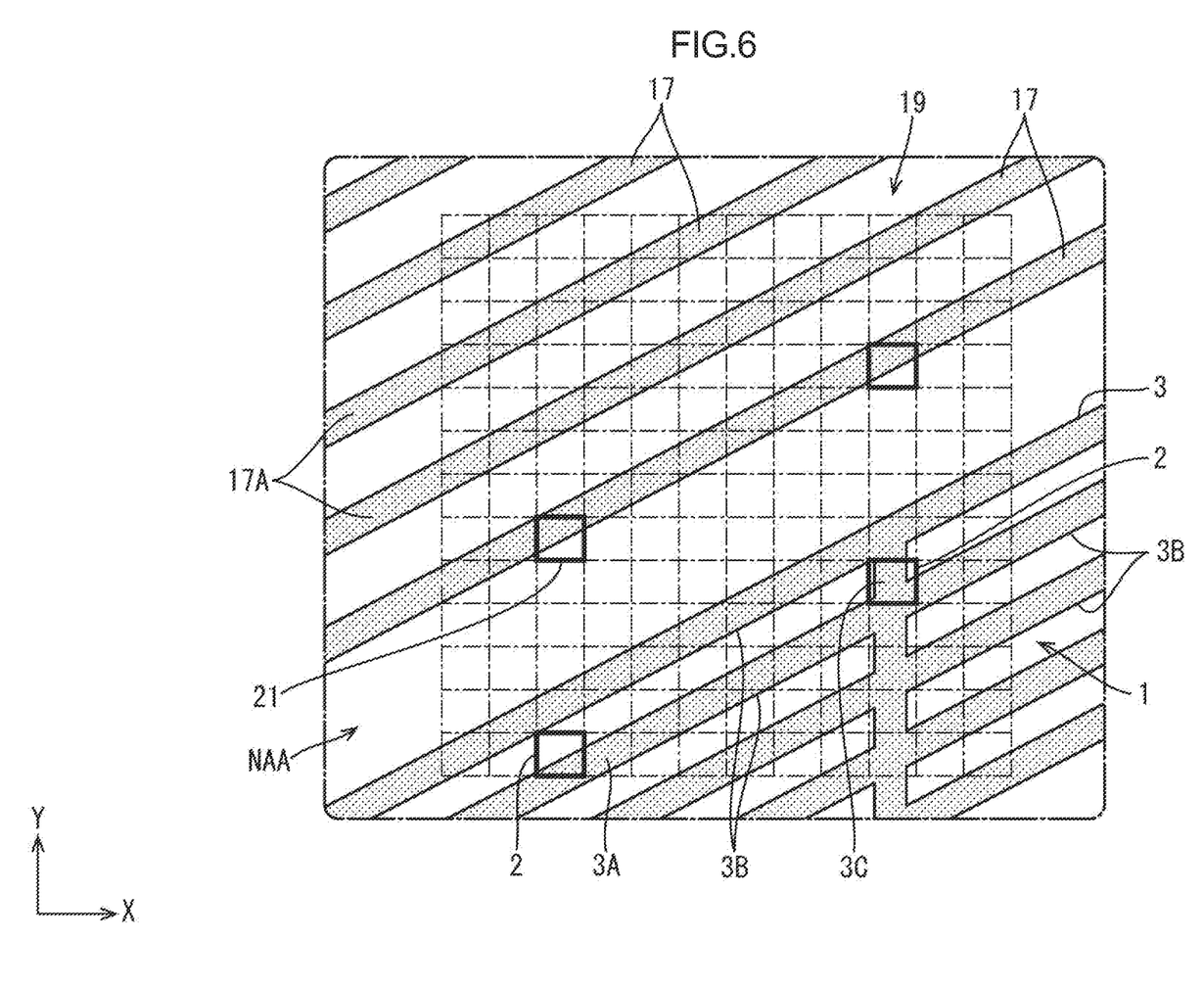
FIG. 6 is a plan view of first unit inspection sections and second unit inspection sections in a first wiring arrangement region with first wirings arranged therein and a second wiring arrangement region with second wiring arranged therein, respectively, in the array substrate according to one comparative example.

Now description will be made of a comparative example. As illustrated in FIG. 6, the comparative example includes a different pattern of second unit inspection sections 2 in the second wiring arrangement region 1. Specifically, the second unit inspection sections 2 include a portion in which slits 3B are formed and a portion in which a bridge 3C is formed in a seal overlapping section 3A of second wirings 3. The wiring formed region in which the second wirings 3 are formed differs from the non-wiring formed region in which no second wiring 3 is formed in pattern in arrangement and area ratio. In this case, inspection images obtained by the second unit inspection sections 2 do not conform. Accordingly, if an erroneous wiring inspection is performed to the second wiring arrangement region 1, which is originally performed to the portion adjacent to the second wiring arrangement region 1 in the first wiring arrangement region 19, defective determination is not performable. This disables a normal wiring inspection to the first wiring arrangement region 19. In order to avoid such a situation, it is decided to stop wiring inspection to the portion adjacent to the second wiring arrangement region 1 in the first wiring arrangement region 19. In doing so, however, if some defect such as a break is generated in the portion adjacent to the second wiring arrangement region 1 in the first wiring arrangement region 19, the defective is unable to be detected, leading to a drawback of delivering defective items.

Then, as illustrated in FIG. 5 in the present embodiment, the second unit inspection sections 22 are set in such a manner that the wiring formed region in which the second wirings 18 are formed and the non-wiring formed region in which no second wiring 18 is formed have an identical pattern in arrangement and area ratio. In doing so, if the wiring inspection is erroneously performed to the second wiring arrangement region 20, the inspection images necessarily conform to one another upon comparison thereof obtained with the photo-detective sensors. This avoids unconformity of the inspection images. Accordingly, the defective determination is avoidable that is caused by the erroneous wiring inspection of the second unit inspection sections 22 by the determining part. This avoids such a situation in which the defective determination is performed to most of the array substrates 10B subjected to the inspection. As described above, such an erroneous inspection is likely to occur when the inspection is performed to the portion adjacent to the second wiring arrangement region 20 in the first wiring arrangement region 19. If it is possible to avoid the defective determination caused by the erroneous inspection, the inspection is performable to the portion adjacent to the second wiring arrangement region 20 in the first wiring arrangement region 19. This allows appropriate detection of the defective generated in the first wiring arrangement region 17 disposed adjacent to the second wiring arrangement region 20 in the first wiring arrangement region 19.

Specifically, as illustrated in FIG. 5, the second wiring arrangement region 20 includes the second unit inspection sections 22 in which no second wiring 18 is formed. In other words, the second wirings 18 are not formed over a certain area adjacent to the first wiring arrangement region 19. The area has a dimension equal to or larger than an amount of displacement possibly caused to the optical automatic defect inspection device (e.g., several tens to 100 μm). In doing so, if an erroneous inspection is performed to the second wiring arrangement region 20, inspection images in the second unit inspection sections 22 are obtained, but no second wiring 18 is present in any of the obtained inspection images. Accordingly, the area ratio of the wiring formed region in which the second wiring 18 is formed is 0%, whereas the area ratio of the wiring formed region in which no second wiring 18 is formed is 100%. This leads to conformity of the inspection images. This avoids defective determination that is caused by the erroneous inspection.

As described above, the array substrate (circuit board) 10B of the present embodiment includes the first wirings 17, the first wiring arrangement region 19, the first unit inspection sections 21, the second wirings 18, the second wiring arrangement region 20, and the second unit inspection sections 22. The first wirings 17 are arranged regularly. The first wiring arrangement region 19 has the first wirings 17 arranged therein. The first unit inspection sections 21 are arranged in the first wiring arrangement region 19 at given intervals and are a target for the inspection images. The second wiring arrangement region 20 is adjacent to the first wiring arrangement region 19 and has the second wirings 18 arranged therein. The second unit inspection sections 22 are arranged in the second wiring arrangement region 20 at given intervals and are occasionally a target for the inspection image.

Firstly, in order to inspect the first wirings 17, the inspection images of the first unit inspection sections are obtained. The first unit inspection sections 21 are arranged at given intervals in the first wiring arrangement region 19. Then, the obtained inspection images are compared with one another. If the inspection images conform, the first wirings 17 are decided to be formed appropriately, thereby being determined non-defective. If the inspection images do not conform, the first wirings 17 are decided to be formed inappropriately, thereby determined defective. On the other hand, the second wirings 18 are arranged in the second wiring arrangement region 20 adjacent to the first wiring arrangement region 19 although the second wirings are not originally subjected to inspection. This may lead to erroneous inspection depending on a certain condition such as accuracy of the inspecting device. In this case, the inspection images in the second unit inspection sections of the second wiring arrangement region 20 are to be taken. The second unit inspection sections 22 are arranged at given intervals. Here, the second wiring arrangement region 20 includes the second unit inspection sections 22 with an identical pattern. Accordingly, the inspection images conform certainly when comparison is made among them. This avoids defective determination caused by the erroneous inspection of the second unit inspection section 22, leading to avoidance of the case such as, when a large number of the array substrates 10B is inspected, most of the array substrates 10B are determined defective. Such an erroneous inspection is likely to occur when a portion in the first wiring arrangement region 19 adjacent to the second wiring arrangement region 20 is inspected. However, when the defective determination caused by the erroneous inspection is avoidable, the portion in the first wiring arrangement region 19 adjacent to the second wiring arrangement region 20 is inspectable. This achieves appropriate inspection of the defective on the portion in the first wirings 17.

Moreover, the second wiring arrangement region 20 includes the second unit inspection sections 22 in which no second wiring 18 is formed. In doing so, if an erroneous inspection is performed to the second wiring arrangement region 20, inspection images in the second unit inspection sections 22 are obtained, but no second wiring 18 is present in any of the obtained inspection images. Accordingly, both of the inspection images conform to each other.

Moreover, provided are the active area AA in which the images are displayed and a plurality of pixels PXs arranged in the active area AA. The first wirings 17 are connected to the pixels PXs, respectively, to supply signals to the pixels PXs for displaying the images. The second wirings 18 are connected to the pixels PXs, respectively, to supply signals to the pixels PXs for displaying the inspection images. In doing so, supply of the signals from the first wirings 17 to the pixels PXs achieves display of the given images on the active area AA. In contrast to this, supply of the signals from the second wirings 18 to the pixels PXs achieves display of the given inspection images on the active area AA. Since the second wirings 18 are only used for the display inspection, no inspection is performed to the second wirings 18.

Moreover, provided are the array substrate 10B described above, the CF substrate (opposite substrate) 10A, and the sealant 10D. The CF substrate 10A adheres to the array substrate 10B via the interior space IS. The sealant 10D is made from an optical curing material, and is disposed between the array substrate 10B and the CF substrate 10A to surround and seal the interior space IS. The second wirings 18 include at least partially the seal overlapping section 18A that overlaps the sealant 10D. The seal overlapping section 18A has at least the slits 18B that are arranged regularly in an opened manner. The second wiring arrangement region 20 includes the second unit inspection sections 22 in which no second wiring 18 is formed. In doing so, the interior space IS between the array substrate 10B and the CF substrate 10A is surrounded and thus sealed by the sealant 10D disposed between both of the substrates. If an erroneous inspection is performed to the second wiring arrangement region 20, inspection images in the second unit inspection sections 22 are obtained, but no second wiring 18 is present in any of the obtained inspection images. Accordingly, the inspection images conform to one another, leading to avoidance of defective determination caused by the erroneous inspection of the second unit inspection sections 22. Moreover, the sealant 10D made from the optical curing material includes the second unit inspection sections 22 in addition to the slides 18B of the second wirings 18 opened in the seal overlapping section 18A that overlaps the sealant 10D. Accordingly, enhanced curing of the sealant 10D is effectively performable with light for curing through to the slits 18B and additionally the second unit inspection sections 22 in which no second wiring 18 is formed.

Second Embodiment

Figure 7:
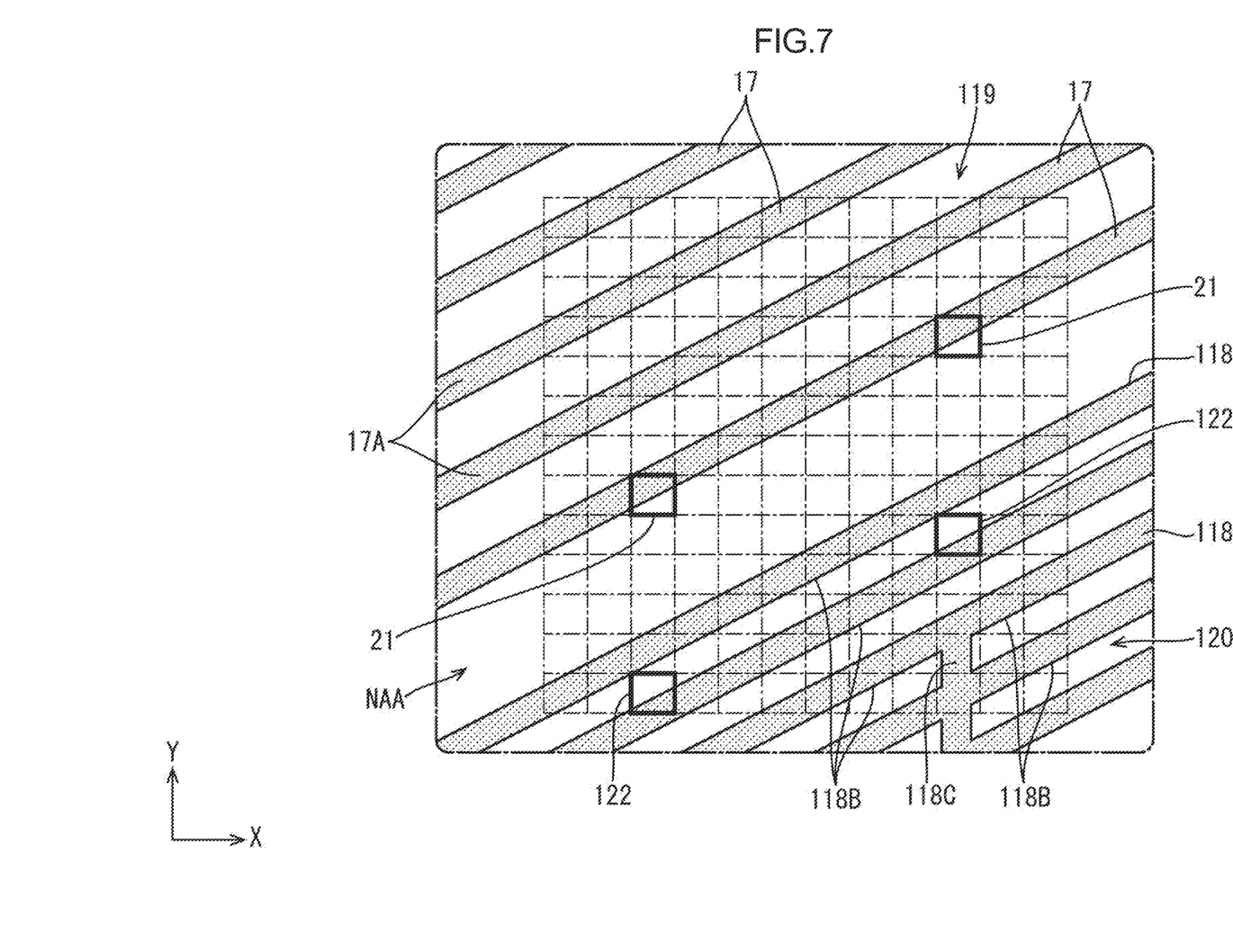
FIG. 7 is a plan view of first unit inspection sections and second unit inspection sections in a first wiring arrangement region with first wirings arranged therein and a second wiring arrangement region with second wiring arranged therein, respectively, in the array substrate according to a second embodiment.

The following describes a second embodiment of the present invention with reference to FIG. 7. The second embodiment illustrates a variation in configuration of a second wiring arrangement region 120. Here, the description of the configuration and operational advantage common to that of the first embodiment is to be omitted.

As illustrated in FIG. 7, the second wiring arrangement region 120 according to this embodiment includes second wirings 118 arranged in a plurality of second unit inspection sections 122 in a regular pattern. Specifically, the second wiring arrangement region 120 has a position in which the second wirings 118 are formed with a distance from the first wiring arrangement region 119 that is equal to or smaller than a displacement possibly caused to the optical automatic defect inspection device (e.g., several tens to 100 µm). On the other hand, the second wiring arrangement region 120 has the second unit inspection sections 122 in which no bridge 118C is formed. More specifically, the second wiring arrangement region 120 has a position having a distance from the first wiring arrangement region 119 larger than the displacement possibly caused to the optical automatic defect inspection device. The position has the bridge 118C formed therein for connecting portions of the seal overlapping section 118A divided by slits 118B (divided second wirings). On the other hand, the second wiring arrangement region 120 has a position having a distance from the first wiring arrangement region 119 that is equal to or smaller than the displacement possibly caused to the optical automatic defect inspection device. The position has only a seal overlapping section 118A and the slits 118B formed therein, and no bridge 118C formed therein. In doing so, if an erroneous inspection is performed to the second wiring arrangement region 120, inspection images of the second unit inspection sections 122 are obtained with the second wirings 118 formed in a regular pattern. Accordingly, the inspection images conform to one another. This avoids defective determination that is caused by the erroneous inspection.

According to this embodiment described above, the second wiring arrangement region 120 includes the second unit inspection sections 122 in which the second wirings 118 are formed in in a regular pattern. In doing so, if an erroneous inspection is performed to the second wiring arrangement region 120, the inspection images in the second unit inspection sections 122 are obtained with the second wirings 18 formed in a regular pattern. Accordingly, the inspection images conform to one another.

Moreover, provided are the array substrate described above, the CF substrate, and the sealant. The CF substrate adheres to the array substrate via the interior space. The sealant is made from an optical curing material, and is disposed between the array substrate and the CF substrate to surround and seal the interior space. The second wirings 118 include at least partially the seal overlapping section 118A that overlaps the sealant. The seal overlapping section 118A has at least the slits 118B that are arranged regularly in an opened manner and the bridge 118C that extends across the slits 118B. The second wiring arrangement region 120 includes the second unit inspection sections 122 in which no bridge 118C is formed. In doing so, the interior space between the array substrate and the CF substrate is surrounded and thus sealed by the sealant 10D disposed between both of the substrates. The sealant made from the optical curing material includes the slides 118B formed in an opened manner in the seal overlapping section 118A of the second wirings 118 that overlaps the sealant. Accordingly, enhanced curing of the sealant is effectively performable with light for curing through to the slits 118B. The bridge 118C allows connection of the divided parts of the slits 118B of the seal overlapping section 118A by extending across the slits 118B of the second wirings 118, thereby ensuring redundancy of the second wirings 118. In doing so, if an erroneous inspection is performed to the second wiring arrangement region 120, the inspection images in the second unit inspection sections 122 are obtained. The inspection images each have the second wirings 118 with the opened slits 118B arranged regularly, but no bridge 118C that extends across the slits 118B is present. Accordingly, the inspection images conform to one another, leading to avoidance of defective determination caused by the erroneous inspection of the second unit inspection sections 122.

Third Embodiment

Figure 8:
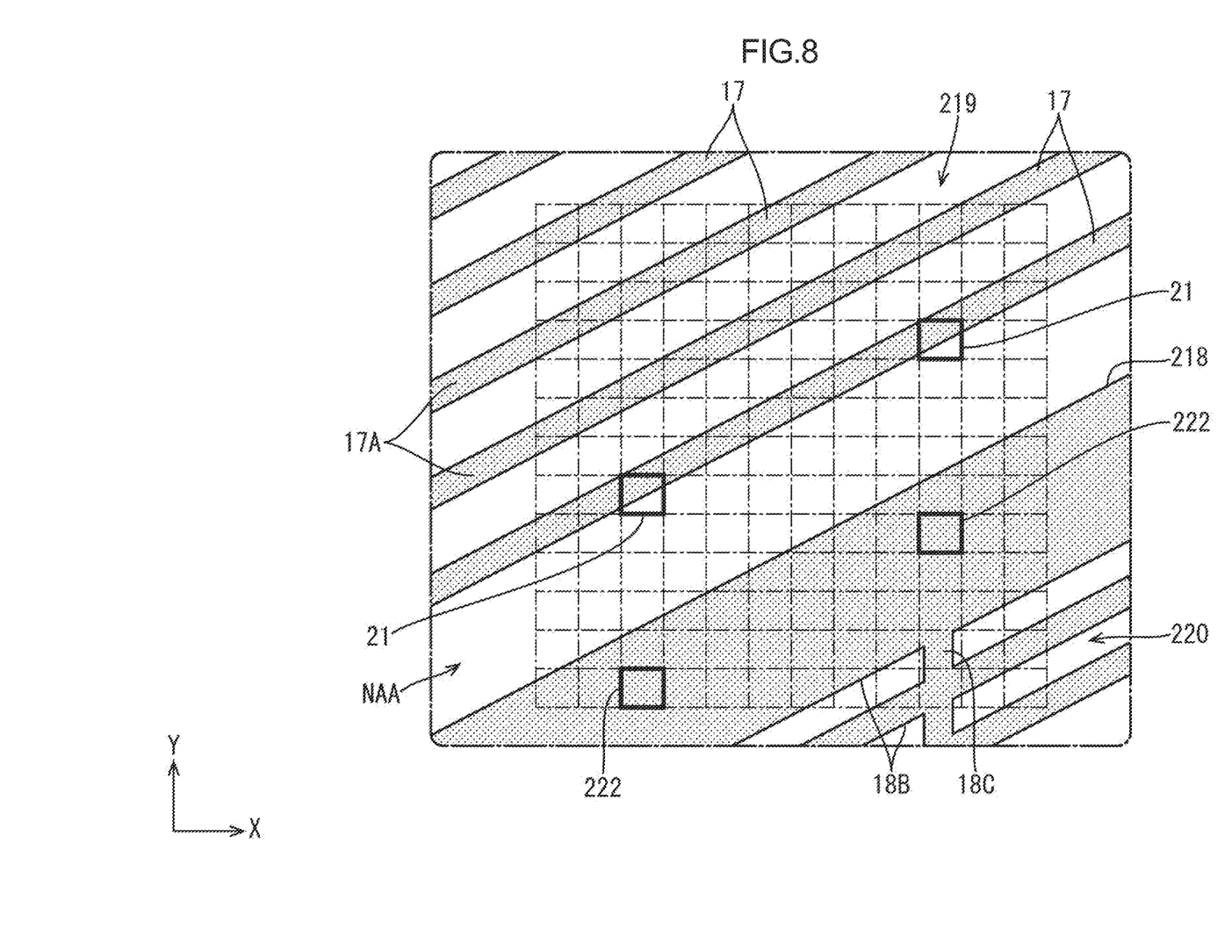
FIG. 8 is a plan view of first unit inspection sections and second unit inspection sections in a first wiring arrangement region with first wirings arranged therein and a second wiring arrangement region with second wiring arranged therein, respectively, in the array substrate according to a third embodiment.

The following describes a third embodiment of the present invention with reference to FIG. 8. The third embodiment illustrates a variation in configuration of a second wiring arrangement region 220 based on the first embodiment described above. Here, the description of the configuration and operational advantage common to that of the first embodiment is to be omitted.

As illustrated in FIG. 8, the second wiring arrangement region 220 according to this embodiment includes second wirings 218 arranged in a plurality of second unit inspection sections 222 in a solid pattern. In other words, the second wiring 218 is formed entirely (flatly) over a certain area adjacent to the first wiring arrangement region 219. The area has a dimension equal to or larger than an amount of displacement possibly caused to the optical automatic defect inspection device (e.g., several tens to 100 µm). In doing so, if an erroneous inspection is performed to the second wiring arrangement region 220, inspection images in the second unit inspection sections 222 are obtained with second wiring over the obtained inspection images in a solid pattern. Accordingly, an area ratio of the wiring formed region in which the second wiring 218 is formed is 100%, whereas an area ratio of the wiring formed region in which no second wiring 218 is formed is 0%. This leads to conformity of the inspection images. This avoids defective determination that is caused by the erroneous inspection.

According to this embodiment described above, the second wiring arrangement region 220 according to this embodiment includes the second wirings 218 arranged in a plurality of second unit inspection sections 222 in a solid pattern. In doing so, if an erroneous inspection is performed to the second wiring arrangement region 220, the inspection images in the second unit inspection sections 222 are obtained with the second wiring 218 formed in a regular pattern. Accordingly, the inspection images conform to one another.

Other Embodiments

The present invention is not limited to the embodiments described above with the description and the drawings. Such embodiments as under are contained in the technical scope of the present invention.

(1) Other than the illustration in the embodiments described above, appropriate variation is applicable for the specific pattern in arrangement and area ratio of the wiring formed region in which the second wirings are formed and the non-wiring formed region in which no second wiring is formed in the second unit inspection sections.

(2) In the embodiments described above, the slits provided in the second wirings extend along the second wirings. However, such a positional relationship is applicable that the slits extend so as to intersect the second wirings. Moreover, the slits do not necessarily extend linearly. Alternatively, the slits may extend while being serpentine in a zigzag manner.

(3) In the embodiments described above, the second wirings are routed so as to extend along the first wirings in parallel. Alternatively, such a positional relationship is applicable that the second wirings extend so as to intersect the first wirings at least partially. Specifically, the second wirings may extend along the first wirings in parallel while a part thereof bends so as to intersect the first wirings.

(4) In the embodiments described above, the second wirings each have a line width larger than the first wirings, and have the slits and the bridge formed therein. Alternatively, the line width of the second wirings may be equal to or less than that of the first wirings. Moreover, the second wirings necessarily have neither the slits nor bridge formed therein.

(5) In the embodiments described above, the second wirings transmit the image signals for display inspection from the driver to the source lines. Alternatively, the second wirings may be used for other applications. For instance, the second wirings may transmit ground potential or power potential.

(6) Other than the illustration in the embodiments described above, appropriate variation is applicable in specific route or arrangement of the first and second wirings.

(7) In the embodiments described above, the driver is subjected to the COG bonding on the array substrate. Alternatively, the driver 11 may be subjected to chip on film (COF) bonding on a flexible board. In this case, the terminals in which the first and second wirings are connected are disposed in the bonding region of the flexible board corresponding to the non-active area of the array substrate.

(8) The above embodiments each exemplarily describe a transparent liquid crystal panel. Alternatively, the present invention is applicable to other types of panels such as a reflective liquid crystal panel or a semitransparent liquid crystal panel.

(9) In the embodiments described above, the liquid crystal panel has a planar shape of a longitudinal rectangle. Alternatively, the planar shape of the liquid crystal panel may be a horizontal rectangle, a square, a circle, a semicircle, an ellipse, an oval, and a trapezoid.

(10) In the embodiments described above, the liquid crystal panel is exemplarily described. Alternatively, other types of display panels are applicable such as a plasma display panel (PDP), an organic EL panel, an electrophoresis display panel (EPD) (microcapsule type electrophoresis display panel), and a micro electro mechanical systems (MEMS) display panel.

The invention claimed is:

1. A circuit board comprising:
   first wirings arranged regularly;
   a first wiring arrangement region having the first wirings arranged therein;
   first unit inspection sections arranged in the first wiring arrangement region at given intervals and being a target for inspection images;
   second wirings;
   a second wiring arrangement region adjacent to the first wiring arrangement region and having the second wirings arranged therein; and
   second unit inspection sections arranged in the second wiring arrangement region at given intervals and occasionally being the target for the inspection images, the second wiring arrangement region having the second unit inspection sections arranged therein in an identical pattern.

2. The circuit board according to claim 1, wherein the second wiring arrangement region includes the second unit inspection sections in which no second wiring is formed.

3. The circuit board according to claim 1, wherein the second wiring arrangement region includes the second unit inspection sections in which the second wirings are formed in a regular pattern.

4. The circuit board according to claim 1, wherein the second wiring arrangement region includes the second unit inspection sections in which the second wirings are formed in a solid pattern.

5. The circuit board according to claim 1, further comprising:
   an active area in which images are displayed; and
   pixels arranged in the active area, wherein the first wirings are connected to the pixels, respectively, to supply signals to the pixels for displaying the images, and the second wirings are connected to the pixels, respectively, to supply signals to the pixels for displaying the inspection images.

6. A display panel comprising:
   the circuit board according to claim 5;
   an opposite substrate adhering to the circuit board via an interior space; and
   a sealant made from an optical curing material and disposed between the circuit board and the opposite substrate to surround and seal the interior space, wherein
   the second wirings include a seal overlapping section overlapping the sealant, and the seal overlapping section includes at least slits arranged regularly in an opened manner, and
   the second wiring arrangement region includes the second unit inspection sections in which no second wiring is formed.

7. A display panel comprising:
   the circuit board according to claim 5;
   an opposite substrate adhering to the circuit board via an interior space; and
   a sealant made from an optical curing material and disposed between the circuit board and the opposite substrate to surround and seal the interior space, wherein
   the second wirings include a seal overlapping section overlapping the, and the seal overlapping section includes at least slits arranged regularly in an opened manner and a bridge extending across the slits, and
   the second wiring arrangement region includes the second unit inspection sections in which no bridge is formed.

* * * * *